United States Patent
Schanin et al.

(10) Patent No.: US 8,982,281 B2
(45) Date of Patent: Mar. 17, 2015

(54) HDMI SWITCH SYSTEM WITH VIDEO ALERTS

(71) Applicants: David J. Schanin, Denver, CO (US); Anthony Anzelmo, Bolivia, NC (US)

(72) Inventors: David J. Schanin, Denver, CO (US); Anthony Anzelmo, Bolivia, NC (US)

(73) Assignee: Hydraconnect Sales LLC, Montrose, CO (US)

( * ) Notice: Subject to any disclaimer, the term of this patent is extended or adjusted under 35 U.S.C. 154(b) by 0 days.

(21) Appl. No.: 13/965,148

(22) Filed: Aug. 12, 2013

(65) Prior Publication Data

US 2015/0042887 A1 Feb. 12, 2015

(51) Int. Cl.
 *H04N 5/268* (2006.01)
 *H04N 21/4363* (2011.01)
 *H04N 21/41* (2011.01)
 *H04N 21/426* (2011.01)
 *H04N 21/435* (2011.01)
 *H04N 21/226* (2011.01)
 *H04N 21/235* (2011.01)

(52) U.S. Cl.
 CPC ..... *H04N 21/43635* (2013.01); *H04N 21/4108* (2013.01); *H04N 21/42607* (2013.01); *H04N 21/435* (2013.01); *H04N 21/226* (2013.01); *H04N 21/235* (2013.01)
 USPC ........... 348/705; 348/706; 348/569; 348/558; 710/16; 710/8

(58) Field of Classification Search
 USPC ......... 348/705, 706, 552–558, 180, 563, 569; 710/8–19
 See application file for complete search history.

(56) References Cited

U.S. PATENT DOCUMENTS

| 2009/0015723 | A1* | 1/2009 | Doumuki | 348/725 |
| 2009/0251605 | A1* | 10/2009 | Hsiao | 348/554 |
| 2010/0118193 | A1* | 5/2010 | Boyden et al. | 348/554 |
| 2012/0327250 | A1* | 12/2012 | Zhang et al. | 348/180 |

\* cited by examiner

*Primary Examiner* — Michael Lee
(74) *Attorney, Agent, or Firm* — Clifton Leon Anderson

(57) ABSTRACT

An HDMI switch system determines whether or not to make a connection requested by an HDMI sink and whether to send video alerts to the sink based on AV stream format and sink capabilities. To these ends, the switch system includes a metadata abstractor to determine a sink's capabilities from EDID data and to characterize an audio-visual stream. These devices are used to either analyze an existing data stream, or construct a new data stream based on the sink's capabilities.

18 Claims, 3 Drawing Sheets

HDMI SWITCH SYSTEM WITH VIDEO ALERTS

PRIORITY CLAIM

This non-provisional utility patent application claims the benefit of U.S. Provisional Application 61/682264 filed 2012 Aug. 12.

BACKGROUND

Custom high-definition home entertainment systems can include one or more High-Definition Multimedia Interface (HDMI) matrix switches controlled by a central control system that allows a user to select among plural sources for video contents and among plural displays on which to view content. Such arrangements can allow different family members to view different contents in different rooms and allow a viewing in progress to follow a viewer who moves from one room to another. Such a matrix switch also allows individual sources to be seen simultaneously on more than one display. This arrangement also allows for all of the various video sources to be hidden in a remote location, leaving only the video display visible in the living areas.

The HDMI™ (High-Definition Multimedia Interface) standard developed and licensed by the HDMI consortium, is a high-speed digital interface for communicating audio and video signals between sources and sinks. HDMI sources can include HDMI-equipped cable boxes, satellite TV boxes, DVD players, Blu-Ray players, computers, HDMI-equipped smart phones, video cameras, hard-disk and memory-based media players, and other HDMI media sources, etc. HDMI sinks can include video display devices such as televisions or projectors and audio output devices.

HDMI video sources require direction from the sinks as to their capabilities in order to provide the proper video and audio data stream. The source will acquire this information from the sink by requesting the sink's Extended Display Identification Data (EDID) data array. EDID is a data structure used by an HDMI sink to describe its capabilities to an HDMI source. The EDID will specify, among other things, the display's capabilities in video resolution and frequency, audio support, and 3D capabilities. Based on this information, the source will provide the proper data stream.

An HDMI matrix switch may read the EDIDs from the various sinks in the system and generate a system wide EDID that is a set of lowest common denominators across the sinks. This system wide EDID is then presented to any source with whom a connection has been requested. This is necessary as, at any time, any sink can connect to any source, and the proper data must be sent to it. For example, if a system has several 1080p capable sinks but one sink capable of only 720p, the system EDID may require 720p for every sink since the 720p only sink can connect at any time and will not be able to display 1080p data.

3D video sources exacerbate this problem. If a matrix-switched high-definition home entertainment system contains at least one source that does support 3D and at least one sink that does not support 3D, the dilemma is how to develop the proper system EDID that will allow the 3D sink to request a 3D video stream while ensuring that the 2D only sinks can also access that source but request a 2D data stream. Using the lowest common denominator approach, 3D video support will not be allowed as not all displays can handle a 3D data stream.

A second 3D EDID related issue is how to handle the issue of sinks joining an existing connection. For example, a 3D sink joining a 2D connection will only provide a 2D display. Even more problematic is a 2D sink joining a 3D connection, in which case it will display distorted video or no video at all. These events will likely frustrate an end user and likely trigger a service call.

DETAILED DESCRIPTION

Figure 1:
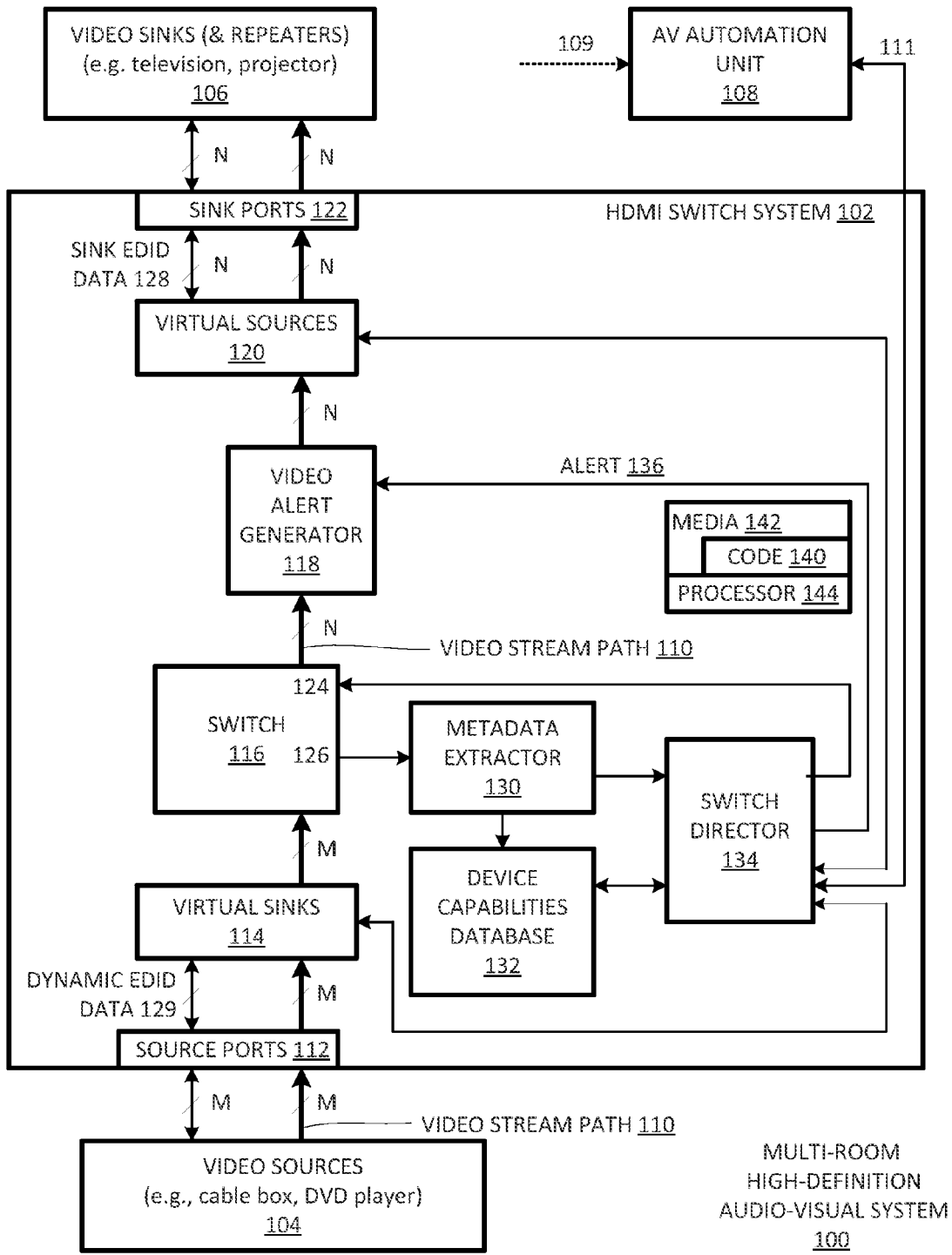
FIG. 1 is a schematic diagram of a multi-room high-definition audio-visual system in accordance with an embodiment of the invention.

In accordance with the present invention, an HDMI switch system 102, shown in FIG. 1, generates video alerts explaining why a viewing experience may be unsatisfactory in some respect despite normal operation of all components. Such video alerts may reduce viewer frustration and reduce the frequency of wasteful service calls to installers of custom audio-video installations.

A multi-room high-definition audio-visual system 100, shown in FIG. 1, includes an HDMI switch system 102 that selectively connects video sources 104 to video sinks 106 in response to commands from an automation unit 108. Automation unit 108 converts viewer commands, e.g., from a wireless remote control unit, to connection requests 111. Video sinks 106 can include HDMI-equipped televisions, projectors, monitors, and other devices that can present visual and/or audio information to human viewers. Video sources include cable boxes, satellite TV boxes, Blu-Ray players, DVD players, etc.

HDMI switch system 102 includes the following components along video stream paths 110 (shown thicker than other connecting lines in FIG. 1): source ports 112, virtual sinks 114, a switch 116, a video alert generator 118, virtual sources 120, and sink ports 122. Source ports 112 and sink ports 122 include standard HDMI connectors, e.g., sockets for engaging HDMI cables.

Virtual sinks 114 are programmed hardware components that appear to sources 104 as sinks 106. Virtual sources 120 are programmed as hardware components that appear to sinks 106 as sources. Virtual sinks 114 and virtual sources 120 allow HDMI switch system 102 to provide capabilities that are not available directly from sources 104 and sinks 106. The additional capabilities include modifying, duplicating, analyzing, and extracting data from video streams.

For example, some HDMI sources can support only one sink, while others that support more than one sink must interrupt a video stream to a first sink to authenticate a second sink. For either type of source, HDMI switch system 102 can duplicate a video stream to provide uninterrupted streams to plural sinks from a source that thinks it is providing a stream to a single sink. Likewise, sinks can provide any data, under the impression that it is providing the data, e.g., EDID data, to a single source. HDMI switch system can implement "dynamic EDID", i.e., use the sink EDID data 128 for its own purposes and decide what "dynamic" EDID-data 129 to pass on and what not to pass on to a video source.

Video alert generator 118 generates video alerts for display on sinks 106. Video alert generator (VAG) 118 has stream inputs, stream outputs, and a control input. The VAG stream inputs are coupled to outputs of switch 116, while the VAG stream outputs are coupled to video inputs of virtual sources 120, which can forward video alerts to the destination sinks. Video alert generator 118 can provide a video alert to a sink by overlaying an alert message on video directed to the sink. If no video is to be directed to the sink, the alert message can be laid over a default video stream, e.g., a solid blue or solid black background for the alert. VAG 118 is implemented by programmable hardware such as that used for OSDs (On-Screen Displays) in televisions to allow a viewer to select viewing options or adjust viewing parameters such as brightness and contrast.

VAG 118 generates alerts on a stream-by-stream basis. Accordingly, different alerts can be overlaid on different instances of a duplicated video stream. Alternatively, one instance can be overlaid with an alert while another instance of the same video stream does not receive an alert.

Switch 116 includes stream inputs coupled, to virtual sinks 114 and stream outputs coupled to VAG 118. Switch 116 can be a matrix switch so that any of the inputs can be coupled to any of the outputs; however, other types of switches are used in alternative embodiments. Ultimately, the settings of switch 116 determine which sinks are connected to which sources.

Switch 116 includes a control input 124 for receiving commands that determine how it couples its inputs and outputs. Switch 116 also includes a monitor output 126 through which it feeds copies of streams and control data for analysis by HDMI switch system 102.

HDMI switch system 102 further includes a metadata extractor 130, a device capabilities database 132, and a switch director 134. Switch director 134 determines the connections to be made by switch 116 and the alerts to be generated by VAG 118. Switch director 134 makes these determinations based at least in part on HDMI/EDID data from metadata extractor 130 and device-capabilities data from database 132. Some alternative embodiments do not implement a device-capabilities database, the device-capabilities used by the switch director is obtained directly from the EDID data.

Metadata extractor 130 receives stream and control data forwarded by switch 116 via monitor output 126. Metadata extractor 130 extracts metadata from the video streams and control data. Herein, "metadata" refers to any data generated in audio-visual system 100 that is not part of an image to be viewed or sound to be heard. Metadata can include EDID data obtained from a sink, video format data obtained from a video stream, control data such as HDMI CEC, and other data.

Metadata extractor 130 is hardware that executes program instructions. Metadata extractor 130 maintains a library of data-structure templates that it uses to detect data-structures in a video stream or in control data. When a matching data structure is found, the metadata of interest is abstracted and either stored in database 132 or forwarded to switch director 134.

In a typical scenario, a viewer selects a source to view while located near a sink using a remote control so that commands are issued by AV Automation Unit 108. Upon detecting that it has been selected, the source can query the sink as to its capabilities. The sink (or Virtual Sink) may respond with EDID data indicating, for example, the resolutions/raster patterns (e.g., 2160p, 1080p, 1080i, 720p), 3D formats, and audio formats it can handle. The sink, may also indicate preferences among the formats it can handle. For example, a sink may prefer a data stream in a native format rather than one, e.g., a higher resolution format, it has to convert. Metadata extractor 130 can collect the EDID data and use it to populate device capabilities database with information regarding the capabilities of video sinks 106. Metadata Extractor 130 may also operate without a source request to gather collect EDID data preemptively.

Although some HDMI sources identify themselves, at least to the extent of their device type (Blu-Ray player, cable box), HDMI sources do not, at least in general, identify their capabilities to the extent HDMI sinks identify their capabilities via EDID data. Even if they did so, often the source's ability to deliver specific video and audio streams is controlled by the source's content. Accordingly, some embodiments of the invention do not populate a device capabilities database with the capabilities of source devices, and do not rely on source-device capabilities to determine what alert messages are to be generated.

Other embodiments populate a device capabilities database with source capabilities using one or more manual or inferential black-box techniques. For example, in some embodiments, a person can manually enter, e.g., through a console or a browser, into a matrix-switching system manufacturer identifiers and model identifiers. The matrix-switching system can then obtain the capabilities, e.g., in an internal (to the switching system) or external (e.g., on a World-Wide Web or other Internet location) database. Alternatively, the capabilities data may be entered manually.

Inferential techniques include extracting metadata from the audio-visual stream, e.g., descriptors in headers indicative of the audio and video formats for the audio-visual data in the stream. Inherently, the formats of a video stream are formats supported by the source of the video stream. Accordingly, whenever a source provides a video stream, some source capability data can be extracted.

HDMI switch system 102 can leverage the stream format descriptors to populate database 132 with source capabilities. Virtual sinks 114 include interrogation routines for interrogating sources 104. For example, a virtual sink can repeatedly select and deselect a source. Each time the source is selected, it transmits a query for sink capabilities. The routine answers each query differently, and metadata extractor 130 determines the formats generated by the source from the resulting audio-visual streams. Thus the routine can determine for each source device the formats it can provide and the sink capabilities required to elicit any particular one of those formats.

The information on source device capabilities can be used to provide alerts that are more fully explanatory. For example, if a switch system knows that a source is 3D capable, it can inform a viewer that the reason that a 3D-capable sink is displaying content in 2D is because, even though the source is 3D capable, the content is not provided in an acceptable 3D format.

Switch director 134 uses sink capabilities data from database 132 and stream format data from metadata extractor 130 to make determinations regarding whether to make requested connections, whether alerts should be issued, and alert content 136. If source capabilities data is available, it can be used to refine the alert content to provide more fully explanatory information to a viewer.

Figure 2:
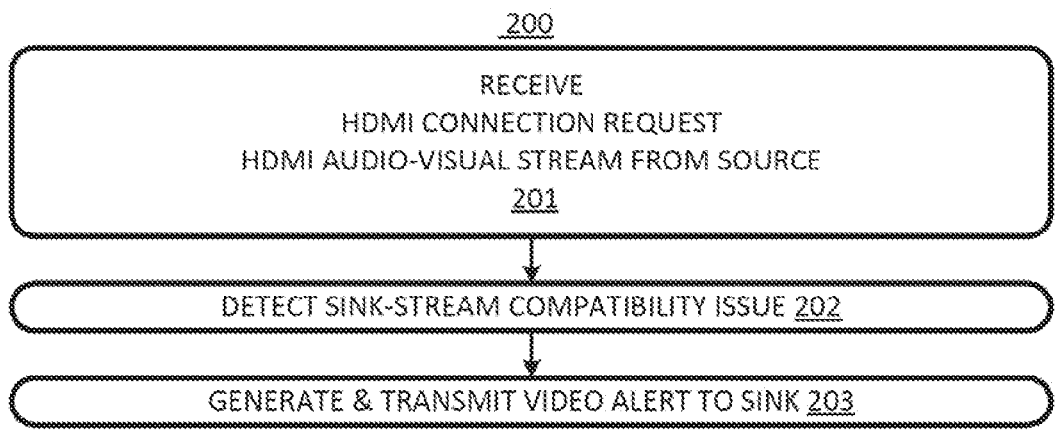
FIG. 2 is a flow chart of a process implemented by the system of FIG. 1.

Switch director 134 implements a process 200, flow charted in FIG. 2. At 201, switch system 102 receives a connection request for an audio-video (AV) stream from automation system 108, and receives the AV stream from an HDMI source. If the request is for a connection to an ongoing AV stream (e.g., an AV stream already being provided to another sink), the video stream is received before the connection request is received. If the request is for a new AV stream, the request is received before the stream is received. At 202, switch director 134 detects a sink-stream compatibility issue, i.e., the stream is not compatible with the sink, or the stream is not optimal for the sink. At 203, switch director 134, in response to the detection, directs VAG 118 to generate an appropriate alert to the sink.

Figure 3A:
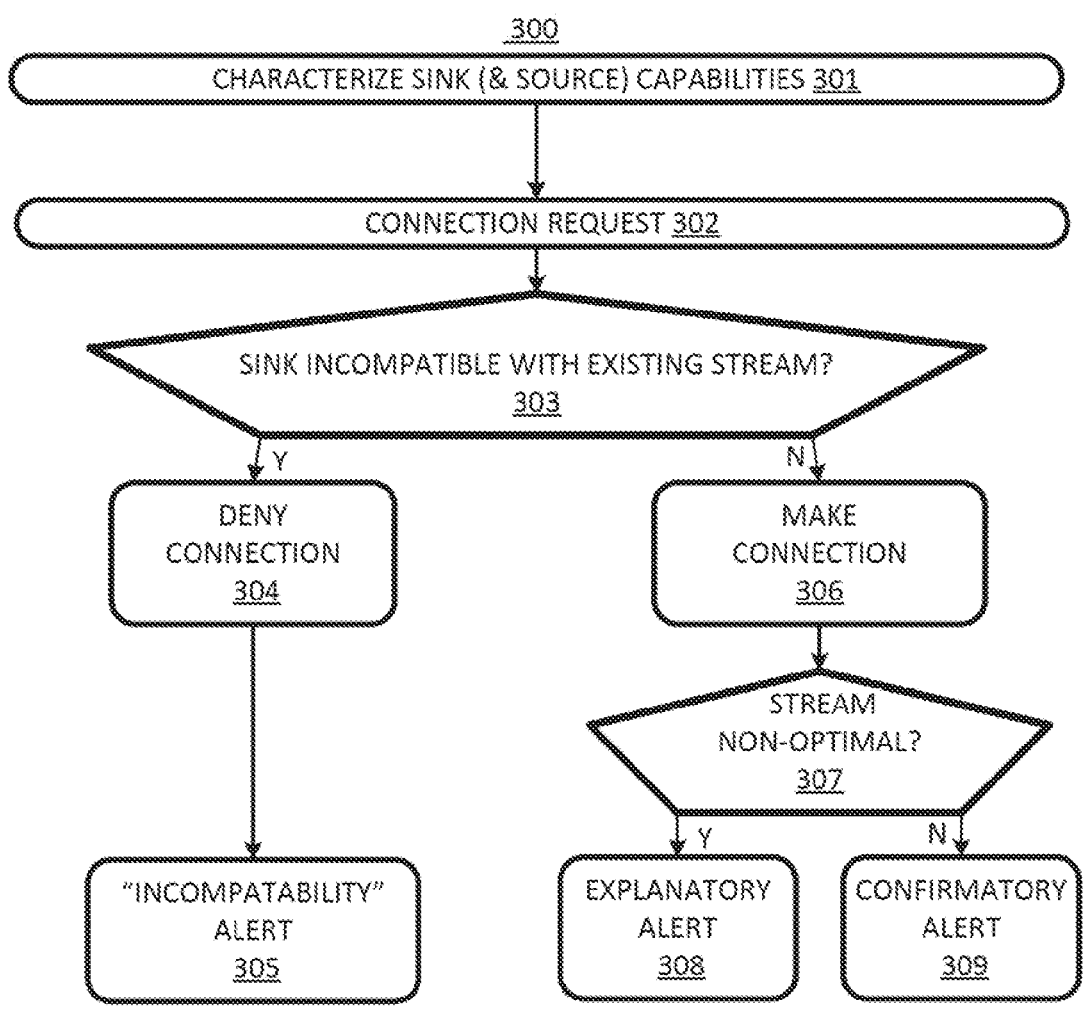
FIG. 3A is a flow chart of an example of a process such as that of FIG. 2.

For example, switch director 134 can implement process 300 (a typical scenario for process 200), which implements the algorithm flow charted in FIG. 3A. At 301, sink capabilities are characterized from extracted EDID metadata.

Figure 3B:
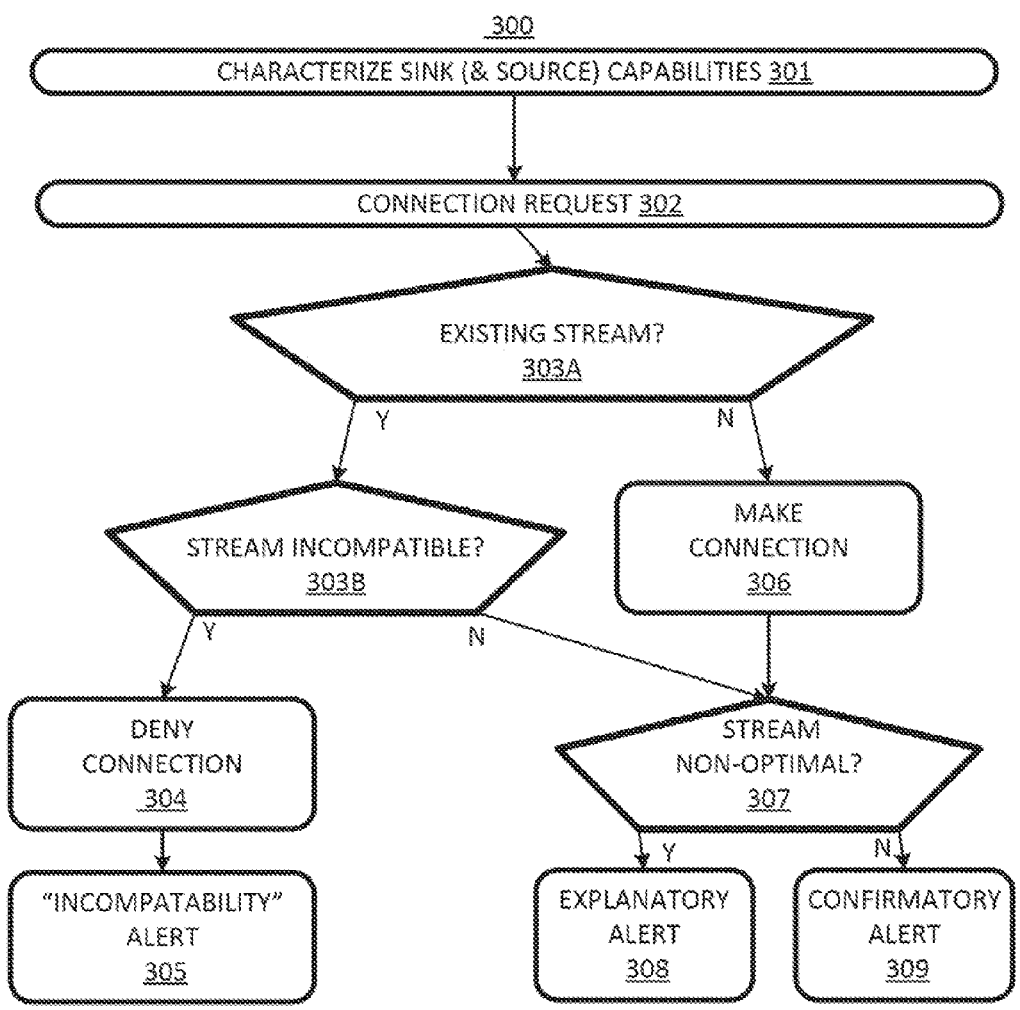
FIG. 3B is an alternative flow chart for the process of FIG. 3.

At 302, a connection request is received from an automation system 108 at port 111 of switch system 102. At 303, switch director 134 determines whether or not the device capabilities for the requesting sink are incompatible with an existing instance of the requested AV stream. As a comparison of FIGS. 3A and 3B demonstrates, action 303 can be divided into two sub-actions: at 303A (FIG. 3B), a determination is made whether or not there is an existing stream; and, if so, then at 303B, a determination is made whether the stream is incompatible (or compatible) with the target sink's capabilities.

If the sink is incompatible with an existing stream, the requested connection is denied at 304. At 305, switch director 134 directs VAG 118 to issue a video alert to be displayed to a viewer by the requesting sink; the alert can be to the effect that the sink is incompatible with the ongoing stream.

If, at 303, it is determined that the sink is not incompatible with an ongoing stream, the requested connection is made at 306. In other words, either there is no ongoing stream, so the request is for a new stream, or the requested stream already exists and the sink is compatible with it. Note that, if there is no existing stream, switch system 102 will send an EDID to the source to initiate a stream. The EDID may or may not correspond to the system EDID or the sink's EDID, depending on the switch programming. For example, the switch system may forward the sink's EDID to obtain as capable of stream as possible for the sink; alternatively, the switch system can send a lower-common-denominator EDID to preserve the ability of less capable sinks to join the stream.

At 307, a determination is made whether the stream is optimal given the capabilities and preferences of the requesting sink. For example, if the requesting sink has at least one preferred capability, and the stream's format is not a preferred format of the requesting sink, the stream is non-optimal. For another example, if the requesting sink does not have a preferred format, but has greater and lesser non-preferred capabilities, and the stream corresponds to a lesser capability, then the stream is non-optimal. For example, a 720p stream would be non-optimal for a sink that can handle 1080p, unless 720p is a preferred capability for the sink, e.g., where the sink must down-convert 1080p to 720p for display purposes.

Non-optimality is actually a two-part test: such a stream must be ongoing and the sink must be incompatible with it. If the requested stream (i.e., a stream provided by the requested source) is not already ongoing, then the stream is not non-optimal. In other words, a stream cannot be non-optimal unless it is ongoing.

If, at 307, it is determined that the stream is non-optimal, then an explanatory alert is issued to the requesting sink at 308. The content of the alert can match the reason that the stream is non-optimal; the alert can, in some cases, be more detailed if source capabilities data is available. If, on the other hand, at 307, it is determined that the stream is optimal, then, at 309, either a confirmatory alert or no alert may be issued. A confirmatory alert might read "Content Displayed Optimally". Note that the functionality of HDMI switch system 102 generally and of switch director 134 specifically can be defined by code 140 encoded in non-transitory computer-readable storage media 142 and executed by processor 144.

In general, multi-room installations where mixed capabilities for video and/or audio are available may result in less than optimum video and/or audio performance for some sinks in the installation. A typical problem would be one where an installation has numerous 1080p resolution sinks, but one 1080i resolution sink. If an initial connection to a source is made by the 1080i sink, additional connections made by the 1080p sinks will only show 1080i resolution video. The user will have no idea why the displayed picture is low resolution. Switch system 102 can detect this scenario and alert a new viewer, that the displayed video is not optimal given the source and sink, but a lower resolution is already committed to the first viewer.

Furthermore, if the 1080i viewer is not connected to a stream, the remaining viewers can view it in 1080p. Hence switch system 102 is not limited to the lowest-common-denominator performance of the prior art.

In a typical multi-room installation, a viewer may not know if a source is being shared. If a second user connects to a source being watched, that second user may start to change source channels in conflict with the first user's wishes. This may lead the first user to track down the location of the second user and inform them of the conflict. The present invention can address this scenario by preventing the channel changing (by intercepting the channel change commands); in that case, a video alert can be displayed to the second viewer explaining that the channel change is being prevented because another viewer has priority viewing of the stream.

Alternatively, the channel change can be allowed and an alert can be sent to the first viewer explaining that another person viewing the content has changed the channel. In some installations, the location of the other viewer can be identified on the display, e.g., messages such as "Sharing With Basement" and "Sharing With Bedroom" can be generated and displayed. Alternatively or in addition, the alert can advise the second viewer to switch to another source. In any of these cases, the alert minimizes the frustration associated with the viewer conflict and reduces the likelihood that the less-than-optimal viewing experience would be attributed to equipment problems.

Generally, an HDMI switch system in accordance with the invention can characterize an HDMI AV installation into which it is incorporated. The switch system can then use the characterization to build a model of the installation. Metadata can be monitored to detect problem scenarios, and the model can be used to determine how to address those scenarios. The scenarios can be addressed by passing through modified or unmodified streams and/or control data, or by blocking certain streams and/or control data. In addition, alerts as appropriate to the scenario and the sink on which they are to be displayed can be generated.

In some scenarios, separate video and audio sources are being supplied to a single location, the typical remote control has only one channel selector and the viewer has no idea whether the channel selector is controlling video or audio channels. In this case, the switch system can detect the two sources and surmise the possible confusion. In response, the switch system can provide feedback in the form of a video alert to the viewer regarding which set of channels is being changed.

Herein, "system" denotes a set of interacting elements including tangible elements such as mechanical components, electrical components, atoms, or process actions. Herein, a process is a system including process actions that create or transform a physical entity. Herein, "storage media" refers to a non-transitory tangible material or structure that is or can be encoded with code representing, for example, computer instructions, or data, e.g., representing including human perceptible images and information.

Herein, a "video alert generator" or "VAG" is a combination of hardware and software executable on that hardware that either generates a video stream bearing a human-readable alert or overlays or otherwise modifies a video stream so that it bears such an alert. Herein, "metadata extractor" refers to a combination of hardware and software executable on that hardware to cause the hardware to extract metadata from a video stream or other data path. Herein, "switch director" refers to a combination of hardware and software executing on that hardware to control the settings of a switch. "Sink", "source", and "repeater" are defined as in the HDMI 1.4 specification.

Herein, a "switch" is a device for selectively coupling outputs to inputs, e.g., video stream outputs to video stream inputs. Herein, an "audio-visual automation unit" is a programmed or programmable device that converts commands from a user and converts them into requests for connections to be implemented, e.g. by a switch. Herein, a "connection" is a switch condition implementing an unbroken communications path between two devices.

Herein, "compatibility issue" between a sink and a stream encompasses: 1) incompatibility, i.e., the sink is incapable of displaying the content represented by the stream, at least as it is intended to be displayed; and 2) non-optimality in that the stream content can be displayed but in a less than optimal manner given the capabilities of the sink. In the latter case, if the sink has at least one preferred capability, the content cannot be displayed with a preferred capability. It the sink does not have a preferred capability, then the content cannot be displayed using a maximum capability in terms of some capability parameter or combination of capability parameters such as dimensionality, resolution.

Herein, "virtual" characterizes hardware programmed to emulate a physical device. Thus, herein, a virtual sink appears to an HDMI source as if it were a physical HDMI sink, while a virtual source appears to an HDMI sink as if it were a physical HDMI source. This can be accomplished by a discrete emulation of a sink and source, or by implementing a repeater. In the claims, "said" refers to elements with explicit antecedent basis; "the" refers to elements with antecedent basis that may be implicit. The described and other variations upon and modifications to the illustrated embodiments are within the scope of the claims.

What is claimed is:

1. A High-Definition Multi-Media Interface (HDMI) switch system comprising:
source ports for connecting to HDMI sources;
sink ports for connecting to HDMI sinks;
a video alert generator for generating video alerts, said video alert generator having video inputs for receiving video streams, said video alert generator having outputs for transmitting said video alerts to said HDMI sinks, said outputs being coupled to said sink ports directly or via virtual sources;
a switch for selectively coupling HDMI sink outputs to HDMI source inputs, said switch including said switch inputs coupled to said HDMI source ports directly or indirectly via virtual sinks, said switch having switch outputs coupled to said video alert generator;
a metadata extractor for extracting HDMI metadata from HDMI streams received at said source ports and Extended Display Identification Data (EDID) data received at said sink ports, said EDID data indicating device capabilities of an HDMI sink; and
a switch director for directing said video alert generator to output a video alert based at least in part on said device capabilities and said HDMI metadata.

2. A system as recited in claim 1 further comprising:
virtual sinks coupled between said source ports and said switch; and
virtual sources coupled between said video alert generator and said sink ports.

3. A system as recited in claim 1 wherein said switch director is further to determine whether or not to make a connection requested by a sink based on said device capabilities and said HDMI metadata.

4. A system as recited in claim 3 wherein said switch director is further to direct said video alert generator to issue a video alert to said sink that said connection has been denied.

5. A system as recited in claim 1 wherein said video alert is to the effect that the stream being provided to a sink is not optimal for the sink given the sink's device capabilities.

6. A process comprising:
receiving,
an HDMI connection request for an HDMI switch system to selectively connect an HDMI source to an HDMI sink,
Extended Display Identification Data (EDID) data from the HDMI sink via a sink port of said HDMI switch system, and
an HDMI audio-visual stream from an HDMI source via an HDMI source port of said HDMI switch system, said audio-visual stream including stream metadata;
extracting said stream metadata from said audio-visual stream;
detecting, by said HDMI switch system, a compatibility issue between said sink and said stream, said detecting being based at least in part on said EDID data and said stream metadata; and
generating and transmitting, by said HDMI switch system, a video alert of the fact of the compatibility issue so that said video alert can be displayed by said sink.

7. A process as recited in claim 6 wherein said detecting includes determining, after said connection request is received, whether or not said stream is incompatible with said sink.

8. A process as recited in claim 7 wherein said determining whether or not said stream is incompatible with said sink results in a detection of a compatibility issue only if said stream is received beginning before said connection request is received and said sink is incompatible with said stream.

9. A process as recited in claim 8 wherein said alert indicates that said stream is incompatible with said sink.

10. A process as recited in claim 6 further comprising, in response to said connection request, making the requested connection, said detecting a compatibility problem between said sink and said stream including detecting that said stream is non-optimal given capabilities of said sink, said video alert indicating that said video is non-optimal.

11. A system comprising computer-readable storage media encoded with code that, when executed by a processor, causes the processor to execute the actions of:
receiving
an HDMI connection request to selectively connect an HDMI source to an HDMI sink,
Extended Display Identification Data (EDID) data from the HDMI sink via a sink port of said HDMI switch system, and
an HDMI audio-visual stream from an HDMI source at an HDMI source port of said HDMI switch system, said audio-visual stream including stream metadata;
extracting said stream metadata from said audio-visual stream;

detecting, by said HDMI switch system, a compatibility issue between said sink and said stream, said detecting being based at least in part on said EDID data and said stream metadata; and generating and transmitting, by said HDMI switch system, a video alert indicative of said compatibility issue so that said video alert can be displayed by said sink.

12. A system as recited in claim 11 wherein said detecting includes determining, after said connection request is received, whether or not said stream is incompatible with said sink.

13. A system as recited in claim 12 wherein said determining whether or not said stream is incompatible with said sink results in a detection of a compatibility problem only if said stream is received beginning before said connection request is received and said sink is incompatible with said stream.

14. A system as recited in claim 13 wherein said alert indicates that said stream is incompatible with said sink.

15. A system as recited in claim 11 further comprising, in response to said connection request, making the requested connection, said detecting of a compatibility problem between said sink and said stream including detecting that said stream is non-optimal given capabilities of said sink, said video alert indicating that said video is non-optimal.

16. A system as recited in claim 11 further comprising said processor.

17. A system as recited in claim 11 wherein said actions further include copying said audio-visual stream and providing a copy of said audio-visual stream to a second sink while said video alert is being transmitted, said copy not having a compatibility issue with said second sink.

18. A process as recited in claim 6 further comprising copying said audio-visual stream and providing a copy of said audio-visual stream to a second sink while said video alert is being transmitted, said copy not having a compatibility issue with said second sink.

* * * * *